United States Patent [19]

Nakauchi et al.

[11] 4,407,895

[45] Oct. 4, 1983

[54] SENSITIVE RESINS COMPRISING 2-ALKYLGLYCIDYL METHACRYLATE HOMOPOLYMER OR COPOLYMER

[75] Inventors: Jun Nakauchi; Tomihiko Kawamura, both of Ohtake, Japan

[73] Assignee: Mitsubishi Rayon Co., Ltd., Tokyo, Japan

[21] Appl. No.: 342,361

[22] Filed: Jan. 25, 1982

Related U.S. Application Data

[63] Continuation of Ser. No. 161,225, Jun. 20, 1980, abandoned.

[30] Foreign Application Priority Data

Jul. 16, 1979 [JP] Japan ................................. 54-90034

[51] Int. Cl.$^3$ ...................... B32B 15/08; B32B 27/30; C08F 20/32
[52] U.S. Cl. .................................. 428/463; 428/522; 526/273
[58] Field of Search ................. 526/273; 428/522, 463

[56] References Cited

U.S. PATENT DOCUMENTS

| | | | |
|---|---|---|---|
| 3,002,004 | 9/1961 | Beavers et al. ...................... | 526/273 |
| 3,852,256 | 12/1974 | Parker et al. ....................... | 526/273 |
| 3,923,761 | 12/1975 | Parker et al. ....................... | 526/273 |
| 4,051,194 | 9/1977 | Ishikawa et al. ..................... | 526/273 |
| 4,068,061 | 1/1978 | Nakagawa et al. ................... | 526/273 |
| 4,087,569 | 5/1978 | Hatzakis . | |
| 4,269,962 | 5/1981 | Kalal et al. .......................... | 526/273 |

OTHER PUBLICATIONS

L. F. Thompson, et al., J. Vac. Sci. Technol., vol. 12, No. 6, Nov./Dec. 1975, pp. 1280–1283, Molecular Parameters and Lithographic Performance of poly (glycidyl methacrylate-co-ethylate); A Negative Electron Resist.

Y. Taniguchi et al.; Jap. J. Appl. Physics, vol. 18, No. 6, Jun. 1979, pp. 1143–1148, PGMA As a High Resolution, High Sensitivity Negative Electron Beam Resist.

*Primary Examiner*—Harry Wong, Jr.
*Attorney, Agent, or Firm*—Brumbaugh, Graves, Donohue & Raymond

[57] ABSTRACT

Photo, electron beam and x-ray sensitive resins are comprised of a 2-alkylglycidyl methacrylate homopolymer or a copolymer containing at least 50 mol % of alkylglycidyl methacrylate. The resins have excellent resolving power and sensitivity and are useful for negative type resists.

4 Claims, 2 Drawing Figures

SENSITIVE RESINS COMPRISING 2-ALKYLGLYCIDYL METHACRYLATE HOMOPOLYMER OR COPOLYMER

This is a continuation of application Ser. No. 161,225 filed June 20, 1980, now abandoned.

DESCRIPTION

1. Technical Field

The present invention relates to a novel photo, electron beam and x-ray sensitive resin which comprises 2-alkylglycidyl methacrylate polymer and which is especially useful as a resin for negative type resits.

2. Background Art

Resist resins used for microfabrication processes in the production of large scale integration (L.S.I.) may be roughly classified as positive type resists and negative type resists. Heretofore, glycidyl methacrylate resins have been used as the negative type resists. They have high sensitivity, but are low in resolving power and heat resistance.

DISCLOSURE OF INVENTION

The present invention demonstrates that high sensitivity resins having a high resolving power can be produced by employing a 2-alkylglycidyl methacrylate polymer which is obtained by substituting an alkyl group for hydrogen at the 2-position of the glycidyl group.

The present invention is a photo, electron beam and x-ray sensitive resin which comprises a 2-alkylglycidyl methacrylate homopolymer or a copolymer containing 2-alkylglycidyl methacrylate in an amount which is at least 50 mol %.

The present invention has an improved resolving power and a sensitivity which are attained by using polymers of 2-alkylglycidyl methacrylate whose selective ring-opening ability at the C—O bond at the 3-position in the molecule is increased by introducing an electron donating alkyl group into the glycidyl group at the 2-position in the molecule. Heat resistance is also increased by the introduction of this relatively bulky structure into the even crosslinked structure.

BEST MODE FOR CARRYING OUT THE INVENTION

Figure 1:
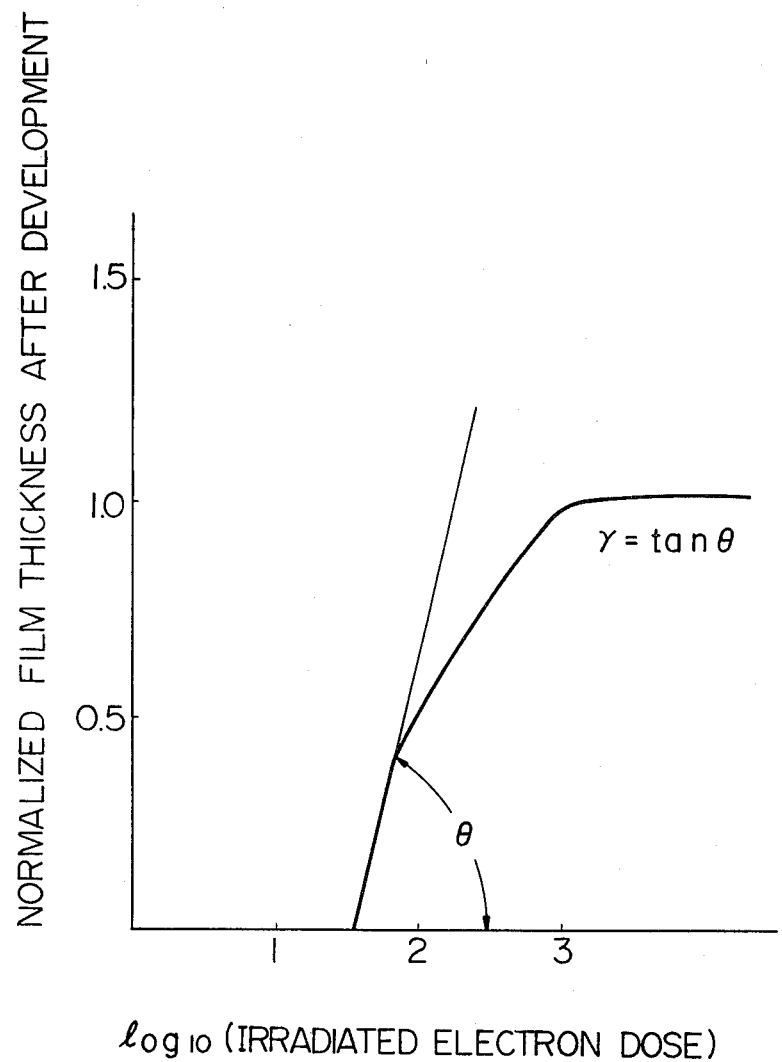
FIG. 1 shows the relationship between normalized film thickness and irradiated electron dose from which the contrast (γ) value is obtained.

The highly sensitive resin of the present invention is a homopolymer of 2-alkylglycidyl methacrylate having the general formula:

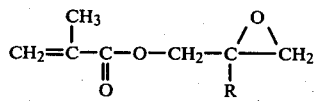

(wherein R is —CH$_3$, —CH$_2$CH$_3$, —CH$_2$CH$_2$CH$_3$, —CH(CH$_3$)$_2$, —C(CH$_3$)$_3$ or —CH$_2$CH(CH$_3$)$_2$) or a copolymer thereof (referred to as merely "2-alkylglycidyl methacrylate polymers" hereinafter).

2-alkylglycidyl methacrylate may be prepared by the reaction of epichlorohydrin with methacrylic acid as follows:

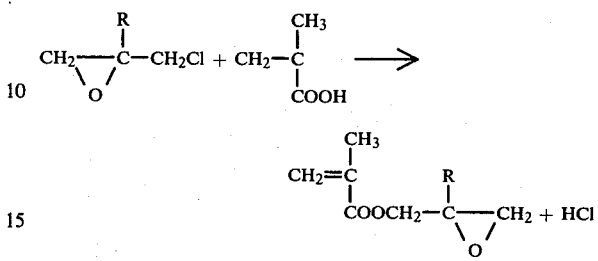

This reaction is explained in more detail in the book "Epoxy Resins" by Mary & Tanaka, pages 54 and 69 (Dekker publishing Co.)

Some examples of monomers used for constituting these 2-alkylglycidyl methacrylate polymers are 2-methylglycidyl methacrylate, 2-ethylglycidyl methacrylate, 2-propylglycidyl methacrylate, 2-isopropylglycidyl methacrylate, 2-tertiarybutylglycidyl methacrylate, 2-isobutylglycidyl methacrylate, etc. These may be used as homopolymers or copolymers comprising a combination of two or more of them. Furthermore, blends of two or more of these polymers may also be used. Moreover copolymers of said monomers with other copolymerizable monomers containing no glycidyl group may also be used, but in these cases sensitivity and resolving power will decrease unless the molecular design of the copolymers is such that they contain at least 50%, preferably at least 60% of glycidyl groups by mol % of the monomers.

Some examples of copolymerizable monomers which can be used are methyl methacrylate, ethyl methacrylate, isopropyl methacrylate, t-butyl methacrylate, hydroxyethyl methacrylate, 2-hydroxypropyl methacrylate, etc.

Molecular weight and distribution of molecular weight of the 2-alkylglycidyl methacrylate polymers are not limitative. However, when number average molecular weight (Mn) is less than 4,000, it is difficult to produce a homogeneous film and when Mn is more than 300,000 the ability to filter the resist solution is conspicuously reduced. When the ratio of the weight average molecular weight to the number average molecular weight (Mw/Mn) is 3 or more, resolving power decreases. Therefore, it is preferred to establish the molecular weight and distribution thereof such that $4{,}000 \leq Mn \leq 300{,}000$ and Mw/Mn < 3.0, respectively.

Methyl cellosolve acetate, isobutyl acetate, isopropyl acetate, propyl acetate, ethyl acetate, methyl isobutyl ketone, methyl ethyl ketone, etc. are solvents which are useful in forming a film of the resins of this invention.

Methyl isobutyl ketone, methyl ethyl ketone, ethyl acetate, methyl ethyl ketone-ethanol mixture, acetone-trichlene mixture, methyl isobutyl ketone-isopropanol mixture, etc. may be suitably used as developing solutions. However, other solvents may also be used if the dissolution speeds of their irradiated parts and their unirradiated parts greatly differ.

The resins of this invention not only exhibit excellent sensitivity and high resolving power to electron rays, far ultraviolet rays and X-rays, but they also adhere well to substrates. Therefore, they are useful for negative type resist films for electron ray lithography, far ultraviolet ray lithography, X-ray lithography, etc.

The present invention is further illustrated by the following examples which demonstrate the preparation of polymers, the formation of films and the evaluation methods employed.

EXAMPLES (1) Preparation of Polymers

Monomers were distilled under reduced pressure in high purity nitrogen and immediately used for experiments. Dimethyl acetamide, distilled once in high purity nitrogen, was used as a polymerization solvent but nearly the same polymers were obtained with the use of dimethylformamide and dimethylsulfoxide. Azobis-2,4-dimethylvaleronitrile (ABVN), which is commercially available, was used as an initiator. The amounts of dimethylacetamide and ABVN used in the polymerization solution were 60 parts by weight and 0.01–0.7 parts by weight per 100 parts by weight of the polymerization solution, respectively.

The polymerization of monomers was carried out as follows: A polymerization solution of monomers was put in a glass ampule tube of 50 mm. in diameter and 18 cm. in length and evacuated at $10^{-2}$ torr by several freeze-pump-thaw cicles. The tube was then sealed and polymerization was carried out in a rotating polymerization tank at 60° C. for 2.5 hours. The polymerization solution was removed from the sealed tube and then diluted with dimethylacetamide so that it contained 5% by weight of monomers charged. It was then purified by reprecipitating it in distilled water. The conversion of monomers into polymers was at least 55% in all cases.

(2) Formation of Film

10 Parts by weight of the purified polymer was dissolved in 50–200 parts by weight of methyl cellosolve acetate. The resultant solution was subjected to filtration using a filter of 0.2 μm mesh. It was then coated on a chrome-plated substrate by a spin coating method at the optimum solution viscosity and rotation speed until final thickness of 0.7±0.05 μm was attained. The solution was then pre-baked at 80° C. for 20 minutes to form a resist film.

(3) Evaluation Methods

Sensitivity and contrast of the resist films were judged by irradiating the films with electron beams at an accelerating voltage of 15 KV and developing them in a methyl isobutyl ketone solution at 25° C. for 5 minutes.

(a) Measurement of Sensitivity

Films were irradiated with different amount of irradiation and then developed in methyl isobutyl ketone at 25° C. for 5 minutes. Minimum irradiation amount required to obtain ½ of their initial thickness was expressed as coulombs (C)/cm². This was taken as sensitivity.

(b) Measurement of Contrast (γ) Value

Normalized film thickness and electron does were plotted as shown in FIG. 1 and the slope of the tangentof the curve "tanθ" was taken as the γ value.

(c) Measurement of Number Average Molecular Weight (Mn) and Weight Average Molecular Weight (Mw) of Polymers.

These were obtained from polystyrene conversion using gel permeation chromatography (G.P.C.)

(4) Examples 1–15 and Comparative Examples 1–5

Resin compositions for resist films which have the compositions shown in Table 1 were prepared and the characteristics were evaluated using the methods for film formation and the evaluation methods mentioned above. The results are shown in Table 1.

(5) Example 16

Thermochemical properties of poly(glycidyl methacrylate) (PGMA) and poly(2-methylglycidyl methacrylate) (PMGMA) which have the same composition as used in Comparative Example 1 and Example 1, respectively, were investigated by a dynamic viscoelastometer VIBRON DDV-II (Toyo Boldwin Co., Ltd.) at 110 Hz, after exposure to 2 KW mercury lamps from a distance of 23 cm. for 13 sec.

Figure 2:
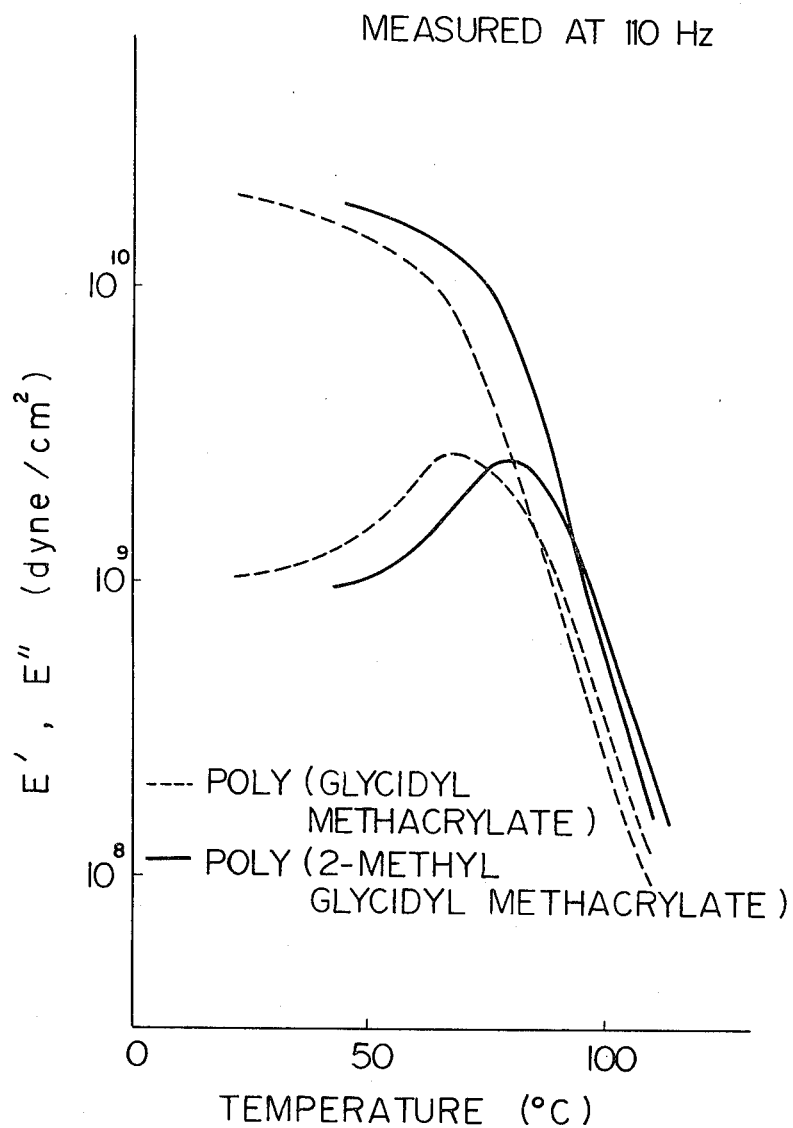
FIG. 2 shows the temperature dependence of E' and E" for poly(glycidyl methacrylate) and poly(2-methylglycidyl methacrylate) exposed from a distance of 23 cm by 2 KW mercury lamps for 13 sec.

As shown in FIG. 2, PMGMA shows the E″ peak at a temperature about 15° C. higher than that of PGMA, and this fact indicates that PMGMA has a higher resistance than PGMA.

TABLE 1

| | 2-alkylglycidyl methacrylate polymers | | | | | | |
|---|---|---|---|---|---|---|---|
| | | Monomer for Copolymerization | | Number average Molecular Weight (Mn) | Ratio of Weight Average Molecular Weight to Number Average Molecular Weight (Mw/Mn) | Results of evolution | |
| | 2-alkylglycidyl methacrylate monomers | Monomer used | Mol. % in co-polymers | | | Sensitivity (C/cm²) | Contrast (γ value) |
| Example 1 | CH₂=C(CH₃)-C(=O)-O-CH₂-C(CH₃)(-O-CH₂-) (epoxide) | — | 0 | 85,000 | 2.4 | 6.0 × 10⁻⁸ | 1.7 |
| Example 2 | CH₂=C(CH₃)-C(=O)-O-CH₂-C(CH₃)(-O-CH₂-) | CH₂=C(CH₃)-C(=O)-O-CH₃ | 20 | 53,000 | 2.2 | 6 × 10⁻⁷ | 1.9 |
| Example 3 | CH₂=C(CH₃)-C(=O)-O-CH₂-C(CH₃)(-O-CH₂-) | CH₂=C(CH₃)-C(=O)-O-CH₂CH₃ | 20 | 51,000 | 2.2 | 1.0 × 10⁻⁷ | 1.8 |

TABLE 1-continued 2-alkylglycidyl methacrylate polymers

| | 2-alkylglycidyl methacrylate monomers | Monomer for Copolymerization – Monomer used | Mol. % in copolymers | Number average Molecular Weight (Mn) | Ratio of Weight Average Molecular Weight to Number Average Molecular Weight (Mw/Mn) | Results of evolution – Sensitivity (c/cm²) | Contrast (γ value) |
|---|---|---|---|---|---|---|---|
| Example 4 | CH₂=C(CH₃)–C(=O)–O–CH₂–C(CH₃)(–O–)CH₂ (epoxide) | CH₂=C(CH₃)–C(=O)–O–CH₂CH₃ | 40 | 48,000 | 2.2 | 3.0 × 10⁻⁷ | 1.5 |
| Example 5 | CH₂=C(CH₃)–C(=O)–O–CH₂–C(CH₃)(–O–)CH₂ | CH₂=C(CH₃)–C(=O)–O–CH(CH₃)–CH | 20 | 60,000 | 2.4 | 9.0 × 10⁻⁸ | 1.8 |
| Example 6 | CH₂=C(CH₃)–C(=O)–O–CH₂–C(CH₃)(–O–)CH₂ | CH₂=C(CH₃)–C(=O)–O–CH₃ | 20 | 12,000 | 2.1 | 3.0 × 10⁻⁷ | 1.9 |
| Example 7 | CH₂=C(CH₃)–C(=O)–O–CH₂–C(CH₃)(–O–)CH₂ | CH₂=C(CH₃)–C(=O)–O–CH₂CH₃ | 20 | 5,500 | 2.1 | 5.10 × 10⁻⁷ | 1.9 |
| Example 8 | CH₂=C(CH₃)–C(=O)–O–CH₂–C(CH₃)(–O–)CH₂ | CH₂=C(CH₃)–C(=O)–O–CH₂CH₃ | 20 | 250,000 | 3.1 | 2.0 × 10⁻⁸ | 1.5 |
| Example 9 | CH₂=C(CH₃)–C(=O)–O–CH₂–C(CH₃)(CH₂)(–O–)CH₂ | — | 0 | 30,000 | 2.1 | 1.8 × 10⁻⁷ | 1.6 |
| Example 10 | CH₂=C(CH₃)–C(=O)–O–CH₂–C(CH₂CH₂CH₃)(–O–)CH₂ | — | 0 | 25,000 | 2.2 | 3.0 × 10⁻⁷ | 1.6 |
| Example 11 | CH₂=C(CH₃)–C(=O)–O–CH₂–C(CH(CH₃)₂)(–O–)CH₂ | — | 0 | 24,000 | 2.1 | 2.8 × 10⁻⁷ | 1.8 |
| Example 12 | CH₂=C(CH₃)–C(=O)–O–CH₂–C(CH₂CH(CH₃)₂)(–O–)CH₂ | — | 0 | 28,000 | 2.3 | 3.5 × 10⁻⁷ | 1.9 |
| Example 13 | CH₂=C(CH₃)–C(=O)–O–CH₂–C(CH₂CH₃)(–O–)CH₂ | CH₂=C(CH₃)–C(=O)–O–CH₂CH₃ | 20 | 15,000 | 2.2 | 7.0 × 10⁻⁷ | 1.8 |

TABLE 1-continued 2-alkylglycidyl methacrylate polymers

| | 2-alkylglycidyl methacrylate monomers | Monomer for Copolymerization | | Number average Molecular Weight (Mn) | Ratio of Weight Average Molecular Weight to Number Average Molecular Weight (Mw/Mn) | Results of evolution | |
|---|---|---|---|---|---|---|---|
| | | Monomer used | Mol. % in co-polymers | | | Sensitivity (c/cm$^2$) | Contrast ($\gamma$ value) |
| Example 14 | $CH_2=C(CH_3)-C(=O)-O-CH_2-C(CH_3)(-O-)CH_2$ and $CH_2=C(CH_3)-C(=O)-O-CH_2C(CH_2-CH_3)-CH_2$ (1/1 molar ratio) | — | 0 | 20,000 | 2.1 | $2.0 \times 10^{-7}$ | 1.6 |
| Example 15 | $CH_2=C(CH_3)-C(=O)-O-CH_2-C(CH_3)(-O-)CH_2$ | $CH_2=C(CH_3)-C(=O)-O-CH_3$ and $CH_2=C(CH_3)-C(=O)-O-CH_2CH_3$ (1/1 molar ratio) | 40 | 35,000 | 2.2 | $4.0 \times 10^{-7}$ | 1.8 |
| Control 1[1] | $CH_2=C(CH_3)-C(=O)-CH_2-C(H)(-O-)CH_2$ | — | 0 | 30,000 | 2.2 | $4.0 \times 10^{-7}$ | 1.0 |
| Control 2[2] | $CH_2=C(CH_3)-C(=O)-CH_2-C(CH_3)(-O-)CH_2$ | — | 0 | 3,000 | 1.8 | $1.5 \times 10^{-6}$ | ~1.3 |
| Control 3[3] | $CH_2=C(CH_3)-C(=O)-CH_2-C(CH_3)(-O-)CH_2$ | — | 0 | 380,000 | 2.9 | $2.0 \times 10^{-8}$ | 1.0 |
| Control 4 | $CH_2=C(CH_3)-C(=O)-CH_2-C(CH_3)(-O-)CH_2$ | — | 0 | 280,000 | 4.2 | $3.0 \times 10^{-8}$ | 0.8 |
| Control 5 | $CH_2=C(CH_3)-C(=O)-CH_2-C(CH_3)(-O-)CH_2$ | $CH_2=C(CH_3)-C(=O)-O-CH_3$ | 60 | 10,000 | 2.8 | $2.0 \times 10^{-6}$ | 0.9 |

Note:
[1] Developing for the measurement of sensitivity was carried out in methyl ethyl ketone (MEK) at 25° C. for 3 minutes.
[2] Strength of the film was so low that the film was cracked.
[3] Filter was choked.

We claim:

1. An article for use in electron beam lithography which comprises a suitable substrate and a suitable thickness of a negative resist film of a 2-alkylglycidyl methacrylate homopolymer or the copolymer containing at least 50 mol % of 2-alkylglycidyl methacrylate, the alkyl group of said 2-alkylglycidyl methacrylate having 1 to 4 carbon atoms and a number average molecular weight (Mn) of from 4,000 to 300,000 and the ratio (Mw/Mn) of weight average molecular weight (Mw) to number average molecular weight (Mn) is less than 3.0, the average molecular weight and weight average molecular weight being obtained from polystyrene conversion using gel permeation chromtography.

2. An article for use in electron beam lithography as described in claim 1 wherein the 2-alkylglycidyl methacrylate is represented by the general formula:

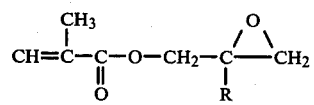

wherein R is —CH₃, —CH₂CH₃, —CH₂CH₂CH₃, —CH(CH₃)₂, —C(CH₃)₃ or —CH₂CH(CH₃)₂.

3. A method of manufacturing an article for use in electron beam lithography which comprises the steps of:
(a) polymerizing a solution which comprises at least 50 mol % 2-alkylglycidyl methacrylate the alkyl group of said 2-alkylglycidyl having 1 to 4 carbon atoms and a number average molecular weight (Mn) of from 4,000 to 300,000 and the ratio (Mw/Mn) of weight average molecular weight (Mw) to number average molecular weight (Mn) is less than 3.0, the average molecular weight and weight average molecular weight being obtained from polystyrene conversion using gel permeation chromatography;
(b) isolating the resulting polymer;
(c) forming a solution of the polymer; and
(d) forming a resist film of a suitable thickness on a suitable substrate.

4. A method of manufacturing an article for use in electron beam lithography as described in claim 3 wherein the 2-alkylglycidyl methacrylate is represented by the following general formula:

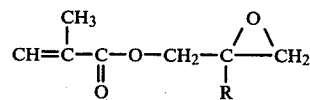

wherein R is —CH₃, —CH₂CH₃, —CH₂CH₂CH₃, —CH(CH₃)₂, —C(CH₃)₃ or —CH₂CH(CH₃)₂.

* * * * *